US009454336B1

(12) United States Patent
Rudradevan et al.

(10) Patent No.: US 9,454,336 B1
(45) Date of Patent: Sep. 27, 2016

(54) SYSTEM AND METHOD FOR IMPROVING USER EXPERIENCE WITH PROXIMITY ESTIMATION

(71) Applicant: Samsung Electronics Co., Ltd., Gyeonggi-do (KR)

(72) Inventors: Rahul Rudradevan, Redwood City, CA (US); Brett Foster, Half Moon Bay, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/818,115

(22) Filed: Aug. 4, 2015

(51) Int. Cl.
H04W 48/04 (2009.01)
G06F 3/14 (2006.01)
G06F 3/0484 (2013.01)
H04W 4/00 (2009.01)
H04W 24/08 (2009.01)

(52) U.S. Cl.
CPC ............ *G06F 3/14* (2013.01); *G06F 3/04842* (2013.01); *H04W 4/008* (2013.01); *H04W 24/08* (2013.01); *H04W 48/04* (2013.01)

(58) Field of Classification Search
CPC  H04W 24/08; H04W 24/0226; H04W 48/04
See application file for complete search history.

(56) References Cited

U.S. PATENT DOCUMENTS

| 8,391,787 B2* | 3/2013 | Kim .................... H04M 1/7253 455/41.1 |
| 2014/0003263 A1* | 1/2014 | Sheriff ................ H04W 36/30 370/252 |
| 2014/0323163 A1* | 10/2014 | Venkatraman et al. ................ G01S 5/0252 455/457 |

* cited by examiner

Primary Examiner — Asghar Bilgrami

(57) ABSTRACT

A mobile electronic device is provided. The mobile electronic device includes a transceiver configured to receive at least a first signal from a first end point and a second signal from a second end point. The mobile electronic device also includes a controller comprising processing circuitry. The controller is configured to measure a signal strength of the first signal and a signal strength of the second signal. The controller is also configured to generate for a display an interface that arranges a first command button associated with the first end point and a second command button associated with a second end point into different display priority slots as a function of the measured signal strength of the first signal and the measured signal strength of the second signal.

20 Claims, 8 Drawing Sheets

SYSTEM AND METHOD FOR IMPROVING USER EXPERIENCE WITH PROXIMITY ESTIMATION

TECHNICAL FIELD

The present application relates generally to electronic devices and, more specifically, to a system and method for displaying user interface information on an electronic device to control automated devices and automation systems and improve a User Experience (UX).

BACKGROUND

Applications such as SMARTTHINGS® and WINK® display static user interfaces on electronic devices. A user manually assigns groups, shortcuts, and the like for display on the static user interfaces. For example, on a WINK® user interface, all lights are located on one page and are statically placed on a display screen of an electronic device. As consumers use their electronic devices to operate more automated devices and automation systems, display interface information increases and becomes less helpful to consumers through increased scrolling, more devices, more display clutter, and the like.

SUMMARY

In a first embodiment, a mobile electronic device is provided. The mobile electronic device includes a transceiver and a controller. The transceiver is configured to receive at least a first signal from a first end point and a second signal from a second end point. The controller includes processing circuitry. The controller is configured to measure a signal strength of the first signal and a signal strength of the second signal. The controller is also configured to generate for a display an interface that arranges a first command button associated with the first end point and a second command button associated with a second end point into different display priority slots as a function of the measured signal strength of the first signal and the measured signal strength of the second signal.

In a second embodiment, a mobile electronic device is provided. The mobile electronic device includes a transceiver and a controller. The transceiver is configured to receive a first plurality of signals from a first plurality of end points and a second plurality of signals from a second plurality of end points. The controller includes processing circuitry. The controller is configured to measure a signal strength of each of the first plurality of signals and a signal strength of each of the second plurality of signals. The controller is also configured to average the signal strengths of the first plurality of signals and the signal strengths of the second plurality of signals. The controller is further configured to generate for a display an interface that arranges a first set of command buttons associated with the first plurality of end points and a second set of command buttons associated with the second plurality of end points into different display priority slots as a function of an average signal strength of the first plurality of signals and the average signal strength of the second plurality of signals.

In a third embodiment, a method implemented using a mobile electronic device is provided. The method includes receiving at least a first signal from a first end point and a second signal from a second end point. The method also includes measuring a signal strength of the first signal and a signal strength of the second signal. The method further includes generating for a display an interface that arranges a first command button associated with the first end point and a second command button associated with a second end point into different display priority slots as a function of the measured signal strength of the first signal and the measured signal strength of the second signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 11, discussed herein, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
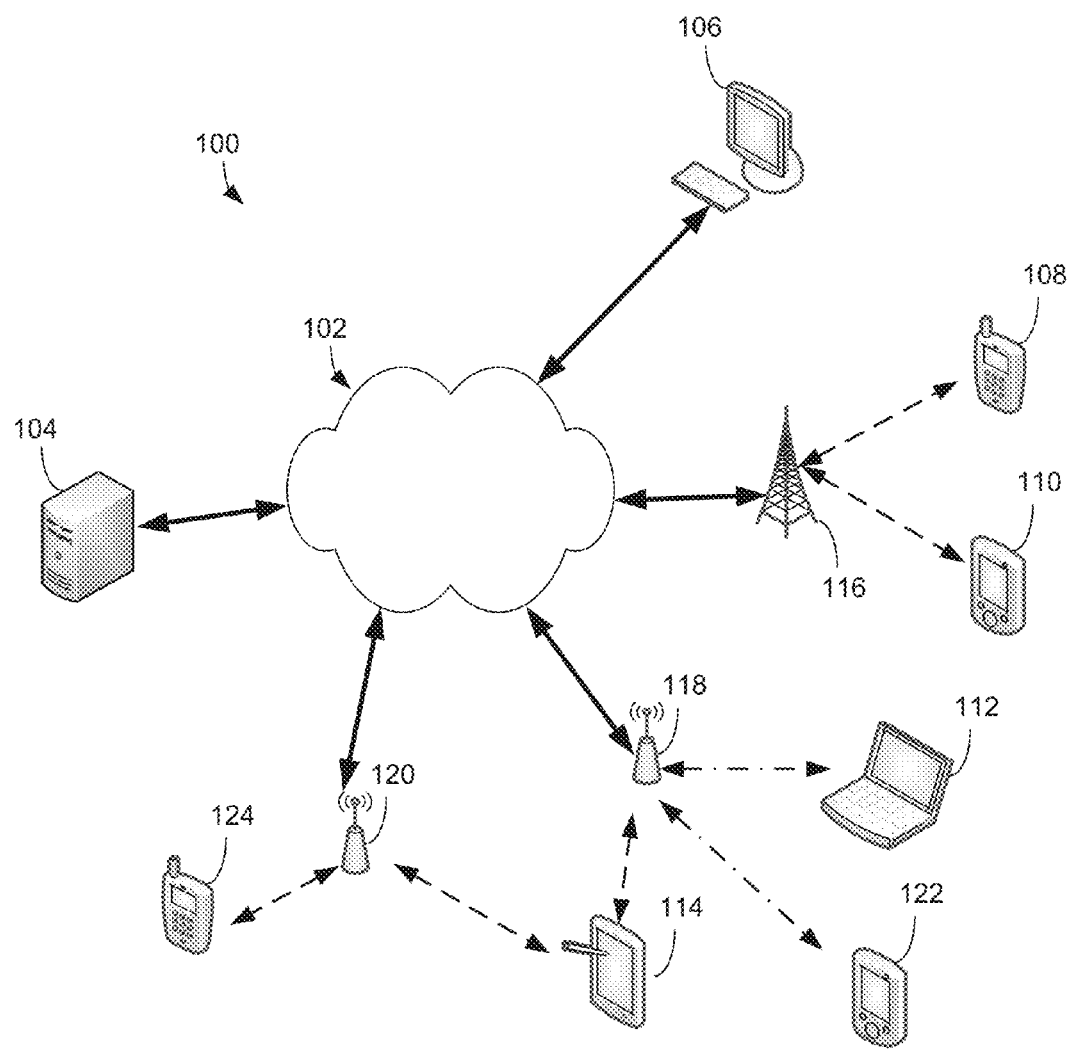
FIG. 1 illustrates an example wireless network according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device, such as mobile electronic devices, that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless end points 118, such as IEEE 802.11 wireless end points. Note that these are for illustration only and that each client device could communicate directly with the network 102 or indirectly with the network 102 via any suitable intermediate device(s) or network(s).

As described in more detail below, one or more of the electronic devices 108-114 report various metrics and metadata about the device to enhance or improve a user experience (UX) with proximity estimation as disclosed in embodiments of the present disclosure. In certain embodiments, one or more servers 104 collect metrics and metadata about the device to enhance or improve a user experience (UX) with proximity estimation as disclosed in embodiments of the present disclosure.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

In certain embodiments, the end point 118 communicates with the tablet 114 via short range communication (SRC). SRC can include, near field communication (NFC), BLUETOOTH® communication, ZIGBEE® communication, wireless local area network (WLAN) communication, and the like. The end point 118 transmits a signal to the tablet 114. The tablet 114 measures a signal strength (such as a received signal strength indication (RSSI)) of the signal transmitted from the end point 118. Meanwhile, the tablet 114 receives another signal from another end point 120 via SRC. The tablet 114 also measures a signal strength of the signal transmitted from the end point 120. The tablet 114 can determine or approximate which of the end points 118 and 120 are located closer to the tablet 114 based on (such as a function of) the measured signal strength of the signals received from each of the end points 118 and 120. For example, the tablet 114 can measure the signal strength of the received signal from end point 118 to be 8.5 while the tablet 114 measures the signal strength of the received signal from end point 120 to be 6.0. Based on determining that the signal strength of the received signal from end point 118 is greater than the signal strength of the received signal from end point 120, the tablet 114 can determine that the end point 118 is closer to the tablet 114 than the end point 120.

The tablet 114 can also associate each of the end points 118 and 120 with electronic devices 122 and 124, respectively. The electronic devices 122 and 124 can include lights, television, air conditioning systems, doors, windows, machinery, home automation devices, or the like. The end point 118 can be located within close proximity of the electronic device 122 and the end point 120 can be located within close proximity of the electronic device 124. The tablet 114 can display an interface on a display to remotely control electronic devices 122 and 124. Based on determining the relative positions of the end points 118 and 120 with respect to the tablet 114, the tablet 114 can arrange a display order of controls for each of the electronic devices 122 and 124. For example, when the tablet 114 determines that end point 118 is closer to the tablet 114 than the end point 120, the tablet 114 displays controls associated with the electronic device 122 with a higher display priority than the controls associated with the electronic device 124. In certain embodiments, the tablet 114 can transmit command signals to the electronic devices 122 and 124 via the end points 118 and 120, respectively. Alternatively, the tablet 114 can transmit command signals directly to the electronic devices 122 and 124 while simply using the end points 118 and 120 to determine the relative proximities of the electronic devices 122 and 124, respectively, to the tablet 114.

Figure 2:
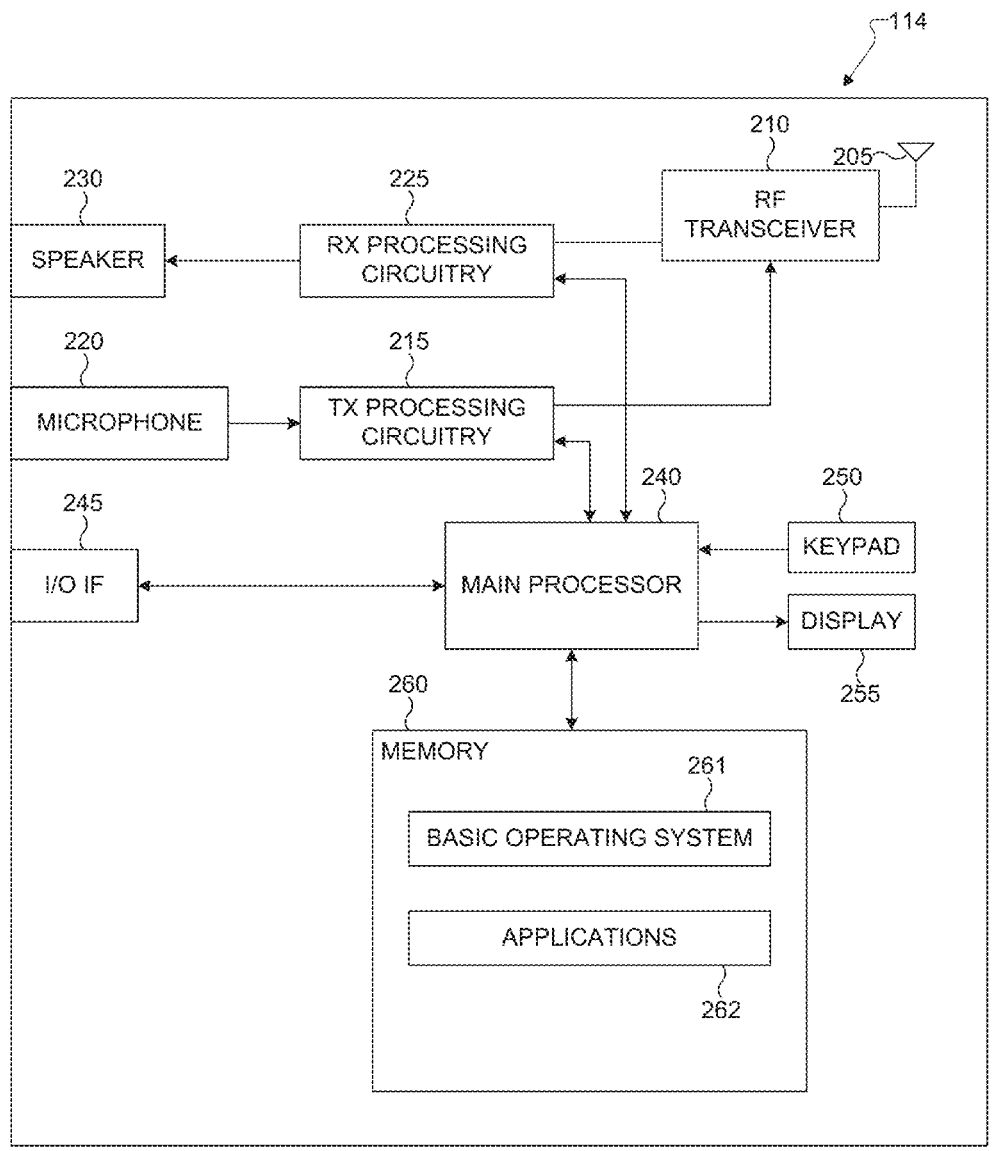
FIG. 2 illustrates an example UE according to this disclosure.

FIG. 2 illustrates an example tablet 114 according to this disclosure. The embodiment of the tablet 114 illustrated in FIG. 2 is for illustration only, and the client devices 106-114, 122 and 124 of FIG. 1 could have the same or similar configuration. However, UEs come in a wide variety of configurations, and FIG. 2 does not limit the scope of this disclosure to any particular implementation of an electronic client device.

As shown in FIG. 2, the tablet 114 includes an antenna 205, a radio frequency (RF) transceiver 210, transmit (TX)

processing circuitry 215, a microphone 220, and receive (RX) processing circuitry 225. The tablet 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 340 for further processing (such as for web browsing data). In an embodiment, the RF transceiver 210 receives signals via the antenna 205 using SRC communication from one or more end points as discussed herein.

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and execute the basic OS program 261 stored in the memory 260 in order to control the overall operation of the tablet 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260, such as measuring signal strengths of signal receives using SRC from one or more end points in the system 100 and supporting improving UX as described in embodiments of the present disclosure. The main processor 240 is also capable of executing other processes and programs resident in the memory 260, such as controlling to display on the display 255 an interface that arranges a display order of controls for each of the electronic devices 122 and 123 based on the determined relative distances of end points with respect to the tablet 114 and to receive commands to remotely control the electronic devices associated with those end points.

The main processor 240 can move data into or out of the memory 260 as required by an executing process. In some embodiments, the main processor 240 is configured to execute the applications 262 based on the OS program 261 or in response to signals received from eNBs or an operator. The main processor 240 is also coupled to the I/O interface 245, which provides the tablet 114 with the ability to connect to other devices such as laptop computers and handheld computers. The I/O interface 245 is the communication path between these accessories and the main controller 240.

The main processor 240 is also coupled to the keypad 250 and the display unit 255. The operator of the tablet 114 can use the keypad 250 to enter data into the tablet 114. The display 255 may be a liquid crystal display or other display capable of rendering text and/or at least limited graphics, such as from web sites. The display 255 can also be a touch screen configured to directly receive touch inputs.

The memory 260 is coupled to the main processor 240. Part of the memory 260 could include a random access memory (RAM), and another part of the memory 260 could include a Flash memory or other read-only memory (ROM).

Although FIG. 2 illustrates one example of tablet 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the tablet 114 configured as a mobile telephone or smartphone, UEs could be configured to operate as other types of mobile or stationary devices.

Figure 3:
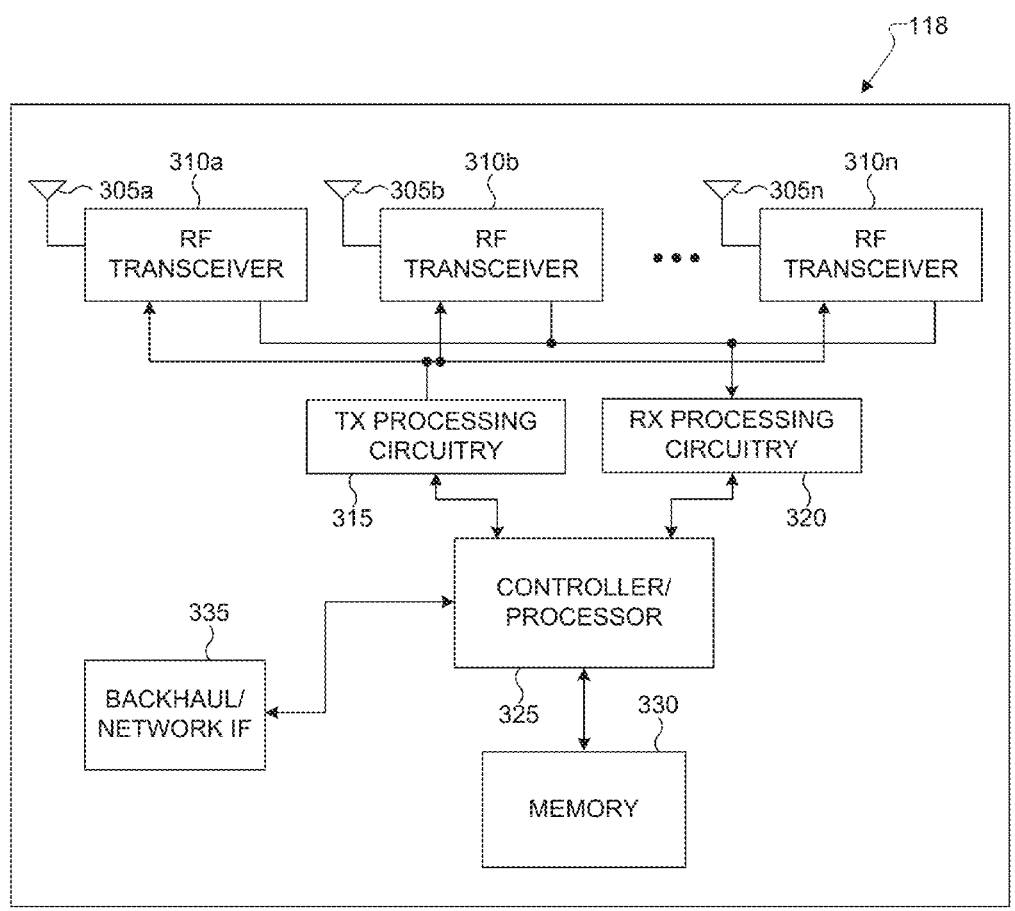
FIG. 3 illustrates an example eNB according to this disclosure.

FIG. 3 illustrates an example end point according to this disclosure. The embodiment of the end point 118 shown in FIG. 3 is for illustration only, and other end points in embodiments of the present disclosure could have the same or similar configuration. However, end points come in a wide variety of configurations, and FIG. 3 does not limit the scope of this disclosure to any particular implementation of an end point.

The end point 118 includes one or more antennas 305a-305n, one or more RF transceivers 310a-310n, transmit (TX) processing circuitry 315, and receive (RX) processing circuitry 320. The TX processing circuitry 315 and RX processing circuitry 320 are respectively coupled to each of the RF transceivers 310a-310n, for example, coupled to RF transceiver 310a, RF transceiver 310b through to a $N^{th}$ RF transceiver 310n, which are coupled respectively to antenna 305a, antenna 305b and an $N^{th}$ antenna 305n. In certain embodiments, the end point 103 includes a single antenna 305a and a single RF transceiver 310a. The end point 103 also includes a controller/processor 325, a memory 330, and a backhaul or network interface 335.

The RF transceivers 310a-310n receive, from the antennas 305a-305n, incoming RF signals, such as signals transmitted by UEs or other end points. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing. The RF transceivers 310a-310n receive, from the antennas 305a-305n, incoming signals using SRC, such as command signals transmitted by UEs. The RF transceivers 310a-310n transmit, from the antennas 305a-305n signal using SRC, such a signal to transmit to the UEs so that the UEs can determine a received signal strength of the signal.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the end point 103. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. Any of a wide variety of other functions could be supported in the end point 103 by the controller/processor 325. In some embodiments, the controller/processor 325 includes at least one microprocessor or microcontroller.

The controller/processor 325 is also capable of executing programs and other processes resident in the memory 330, such as a basic OS and collecting various metrics and metadata about coupled devices as described in various embodiments of the present disclosure. The controller/processor 325 can move data into or out of the memory 330 as required by an executing process.

The controller/processor 325 can also be coupled to the backhaul or network interface 335. The backhaul or network interface 335 allows the end point 103 to communicate with other devices or systems over a backhaul connection or over a network. The controller/processor 325 can also be coupled to one or more electronic devices as discussed herein. The interface 335 could support communications over any suitable wired or wireless connection(s). The interface 335 could allow the end point 118 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described herein, the transmit and receive paths of the AP 118 (implemented using the RF transceivers 310a-310n, TX processing circuitry 315, and/or RX processing circuitry 320) support channel bonding in wireless local area network systems. The transmit and receive paths of the end point 118 are configured to support channel bonding in wireless local area network systems.

Although FIG. 3 illustrates one example of an end point 118, various changes may be made to FIG. 3. For example, the end point 118 could include any number of each component shown in FIG. 3. As a particular example, an end point could include a number of interfaces 335, and the controller/processor 325 could support routing functions to route data between different network addresses. As another particular example, while shown as including a single instance of TX processing circuitry 315 and a single instance of RX processing circuitry 320, the end point 118 could include multiple instances of each (such as one per RF transceiver).

Figure 4:
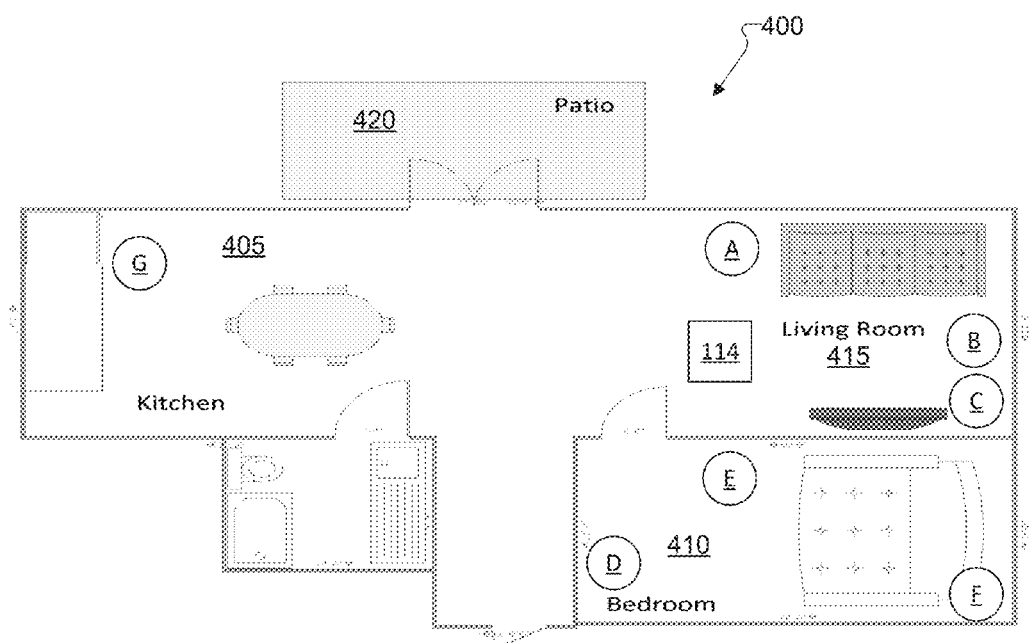
FIG. 4 illustrates an example monitoring and automation system according to this disclosure.

FIG. 4 illustrates an example monitoring and automation system 400 according to this disclosure. The embodiment of the monitoring and automation system 400 illustrated in FIG. 4 is for illustration only, and the wireless network 100 of FIG. 1 could have the same or similar configurations. However, monitoring and automation systems come in a wide variety of configurations, and FIG. 4 does not limit the scope of this disclosure to any particular implementation of a monitoring and automation system.

The monitoring and automation system 400 includes one or more end points A, B, C, D, E, F, and G. In an embodiment, the end points A-G can each be associated with electronic devices, such as electronic devices 122 and 123 illustrated in FIG. 1. End point G is located in kitchen 405. End points D, E, and F are located in bedroom 410. End points A, B, and C are located in living room 415. The patio 420 does not include an end point. The system 400 also includes a tablet 114. Each of the end points A-G can be the same or similar to end point 103 illustrated in FIGS. 1 and 3. Each of the end points A-G communicates with the tablet 114 via SRC. SRC can include BLUETOOTH® communication, ZIGBEE® communication, wireless fidelity (WiFi) communication, and the like.

Each of the end points A-G transmits a signal to the tablet 114. The tablet 114 measures a signal strength (such as a received signal strength indication (RSSI)) of each signal transmitted from each of the end points A-G. The tablet 114 can determine or approximate the relative distances between each of end points A-G and the tablet 114 based on (such as a function of) the measured signal strength of each signal received from each of the end points A-G. For example, the tablet 114 can measure the signal strength of the received signal from end point A to be 9.3, end point B to be 8.5, end point C to be 7.1, end point D to be 5.6, end point E to be 5.5, end point F to be 4.9, and end point G to 1.2. Based on determining that the signal strength of the received signal from each of the end points A-G, the tablet 114 can determine that the end point A is closest to the tablet 114, followed by end point B, followed by end point C, followed by end point D, followed by end point E, followed by end point F. The tablet 114 can also determine that end point G is the farthest from the tablet 114 relative to the end points A-F.

The tablet 114 can also associate each of the end points A-G with electronic devices (such as electronic devices 122 and 123 illustrated in FIG. 1). The electronic devices can include lights, television, air conditioning systems, doors, windows, machinery, or the like. The end points A-G can each be located within close proximity to an electronic device (such as different electronic devices).

Although FIG. 4 illustrates one example of a monitoring and automation system 400, various changes may be made to FIG. 4. For example, various components in FIG. 4 could be combined, further subdivided, or omitted and additional components could be added according to particular needs.

Figure 5:
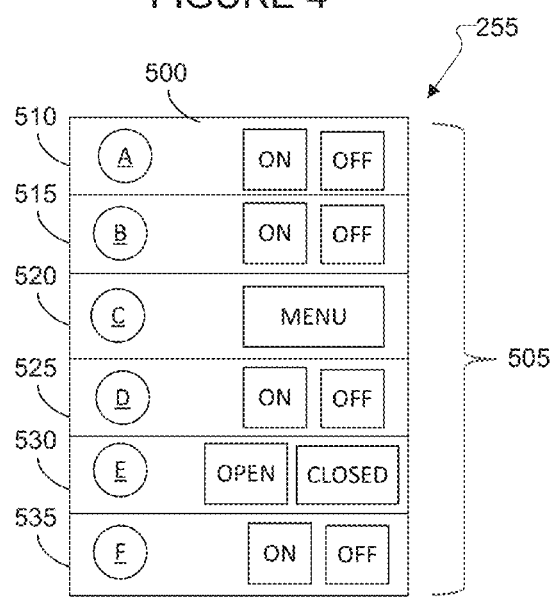
FIG. 5 illustrates an example interface displayed on a display of a UE according to this disclosure.

FIG. 5 illustrates an example interface 500 displayed on a display 225 of a tablet 114 according to this disclosure. The embodiment of interface 500 illustrated in FIG. 5 is for illustration only. However, interfaces come in a wide variety of configurations, and FIG. 5 does not limit the scope of this disclosure to any particular implementation of an interface.

As discussed above, the tablet 114 can associate each of the end points A-G with electronic devices. The tablet 114 displays an interface 500 on a display 255 to receive inputs at command buttons 505 associated with each of the end points A-G and thus the electronic devices. The command buttons 505 initiate the transmission of one or more command signals to initiate functions of electronic devices. Because the tablet 114 determines the relative positions of the end points A-G with respect to the tablet 114, the tablet 114 can arrange command buttons 505 for each end point A-G associated with each of the electronic devices in display priority order on the interface 500. The display priority order is based on the determined relative positions of the end points A-G with respect to the tablet 114.

For example, as shown in FIG. 5, when the tablet 114 determines that the end point A is closest to the tablet 114, followed by end point B, followed by end point C, followed by end point D, followed by end point E, followed by end point F and that end point G is furthest from the UE relative to end points A-F, the tablet 114 displays the command buttons for end point A in the highest priority slot 510, the command buttons for end point B in the second highest priority slot 515, the command buttons for end point C in the third highest priority slot 520, the command buttons for end point D in the fourth highest priority slot 525, the command buttons for end point D in the fifth highest priority slot 525, the command buttons for end point F in the sixth highest priority slot 530. Furthermore, the tablet 114 can leave the command buttons for end point G off the interface 500 because it has the lowest priority of the end points.

In an embodiment, the tablet 114 can display the command buttons of each of the end points A-G in display priority slots 510, 515, 520, 525, 530, and 535 based on a frequency of use, time of day, or personal preferences of electronic devices associated with each of the end points. It should be understood that command buttons can be selected to transmit "on" commands to turn on an electronic device, "off" commands to turn off an electronic device, "open" commands to open a door or window using an electronic device, "closed" commands to close a door or window of an electronic device, and the like, as well as to display another menu on the interface 500 to input operation commands to an electronic device.

In an embodiment, the tablet 114 can move to a different location within the monitoring and automation system 400. In this case, the measured signal strengths of the end points measured by the tablet 114 can change due the changes in distance between the tablet 114 and each of the end points. The tablet 114 can measure new signal strengths from the end points in response to detecting a changing in location of the tablet 114. Accordingly, the tablet 114 can generate a new display that reprioritizes (or rearranges) the end points and respective command buttons into different display priority slots on the interface 500 based on the new relative signal strengths of the signal received from each of the end points by the tablet 114 at the different location.

Although FIG. 5 illustrates one example interface 500 displayed on a display 225 of a tablet 114, various changes may be made to FIG. 5. For example, various components in FIG. 5 could be combined, further subdivided, or omitted and additional components could be added according to particular needs. As a particular example, the display priority slots could be arranged in a side-by-side arrangement, a grid arrangement, or the like. Additionally, fewer or more display priority slots could be displayed on the interface 500 regardless of the number of signals received and measured signal strengths measured by the tablet 114.

Figure 6:
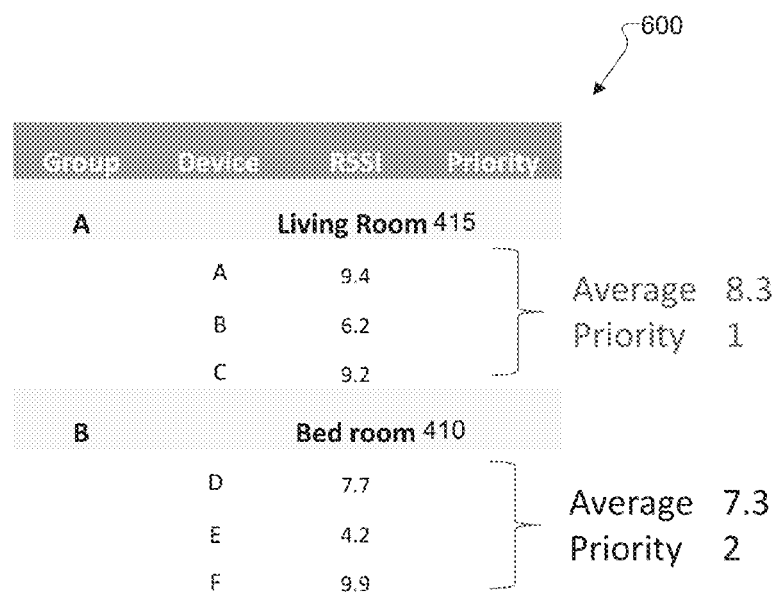
FIG. 6 illustrates an example chart illustrating end points that are grouped according to this disclosure.

FIG. 6 illustrates an example chart 600 illustrating end points that are grouped (for example by particular rooms) according to this disclosure. The embodiment of chart 600 to group end points as illustrated in FIG. 6 is for illustration only. However, end points can be grouped based on a wide variety of parameters (such as type of electronic device associated with the end point), and FIG. 6 does not limit the scope of this disclosure to any particular implementation of grouping end points. Although FIG. 6 illustrates averaging a first group of end points and averaging a second group of end points, a plurality of groups of end points can additionally be averaged. For example, a third group of end points can be averaged and a fourth group of end points can be averaged in addition to the first group of end points and the second group of end points.

In an embodiment, electronic devices associated with end points can be group by room. For example, as shown in FIG. 6, end points A, B, and C can be grouped into living room 415 and end points D, E, and F can be grouped into bedroom 410. As discussed herein, the tablet 114 can measure signal strengths of signals from each of the end points A-F. The tablet 114 can also recognize that end points A, B, and C are grouped together and end points D, E, and F are grouped together. The tablet 114 can average the signal strengths of the signal received from end points A, B, and C based on the grouping and can average the signal strengths of the signal received from end points D, E, and F based on the grouping. For example, the tablet 114 can determine that the average signal strength of end points A, B, and C in room 415 is 8.3 while the average signal strength of end points D, E, and F in room 410 is 7.3. The tablet 114 can assign end points A, B, and C to a higher priority than end points D, E, and F based on the average signal strengths of each group. The tablet 114 can display, on the interface 500, command buttons of electronic devices associated with end points A, B, C, in higher display priority slots than command buttons of electronic devices associated with end points D, E, and F based on the assigned relative group priority.

Although FIG. 6 illustrates one example chart 600 illustrating end points that are grouped by particular rooms, various changes may be made to FIG. 6. For example, end points could be grouped by one or more different or additional factors known by a person having ordinary skill in the pertinent arts.

Figure 7:
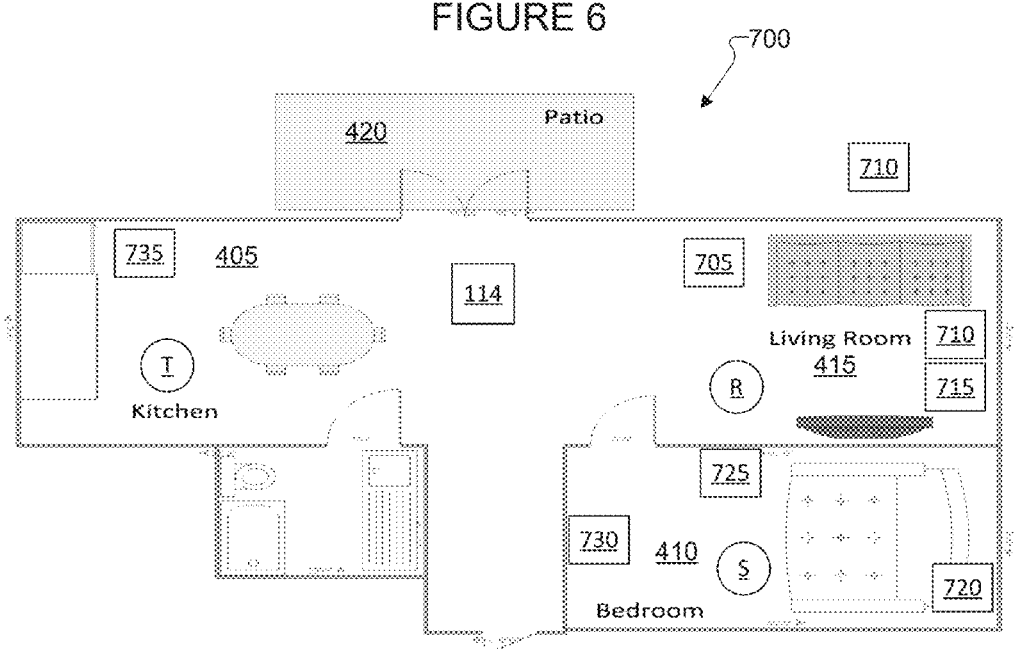
FIGS. 7, 8, and 9 illustrate example monitoring and automation systems according to this disclosure.

FIG. 7 illustrates an example monitoring and automation system 700 according to this disclosure. The embodiment of the monitoring and automation system 700 illustrated in FIG. 7 is for illustration only, and the monitoring and automation system 700 of FIG. 7 could have the same or similar configurations. However, monitoring and automation systems come in a wide variety of configurations, and FIG. 7 does not limit the scope of this disclosure to any particular implementation of a monitoring and automation system.

The monitoring and automation system 700 includes many of the same or similar features of the monitoring and automation system 400 including one or more end points R, S, and T each associated with electronic devices. The end points R, S, and T are proximity beacons. End point R is associated with electronic devices 705, 710, and 715. End point S is associated with electronic devices 720, 725, and 730. End point T is associated with electronic device 735. The electronic devices 705, 710, 715, 720, 725, 730, and 735 are the same or similar to electronic devices 122 and 123 illustrated in FIG. 1.

As discussed herein, the tablet 114 can measure signal strengths of signals from each of the proximity beacons. The tablet 114 can also recognize that proximity beacons R, S, and T are associated with groups of electronic devices. The tablet 114 can prioritize the proximity beacons and, thus, the groups of electronic devices based on measured signal strengths of received signals from each of the proximity beacons. For example, the tablet 114 can determine that the measured signal strength of the received signal from beacons R is 9.2, the measured signal strength of the received signal from beacon S is 7.5, and the measured signal strength of the received signal from beacon T is 2.8.

The tablet 114 can assign electronic devices 705, 710, and 715 to a higher priority than electronic devices 720, 725, and 730 because proximity beacon R has a greater measured signal strength than proximity beacon S. The tablet 114 can display, on the interface 500, command buttons of electronic devices 705, 710, and 715 in higher display priority slots than command buttons of electronic devices 720, 725, and 730 based on the assigned relative group priority. The tablet 114 can also assign electronic device 735 to the lowest priority and either display on the interface 500 command buttons of electronic device 735 in a lowest display priority slot or not display the command buttons of the electronic device 735 on the interface 500.

Although FIG. 7 illustrates one example monitoring and automation system 700 according to this disclosure, various changes may be made to FIG. 7. For example, end points could be grouped by one or more different or additional factors known by a person having ordinary skill in the pertinent arts.

Figure 8:
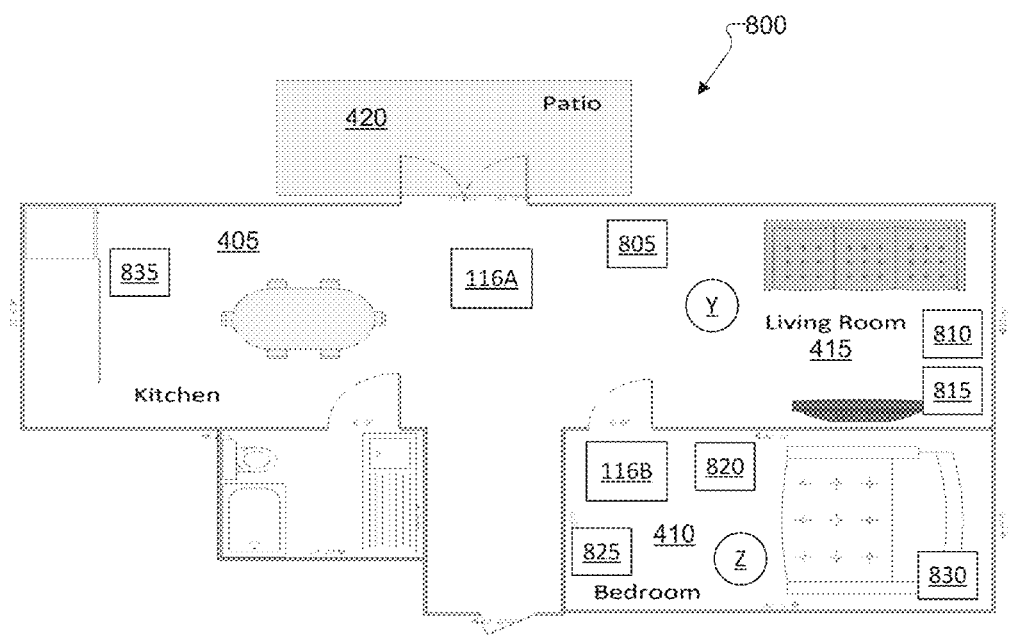

FIG. 8 illustrates an example monitoring and automation system 800 according to this disclosure. The embodiment of the monitoring and automation system 800 illustrated in FIG. 8 is for illustration only, and the monitoring and automation system 800 of FIG. 8 could have the same or similar configurations. However, monitoring and automation systems come in a wide variety of configurations, and FIG. 8 does not limit the scope of this disclosure to any particular implementation of a monitoring and automation system.

The monitoring and automation system 800 includes an access point (such as a WLAN access point) Y and an access point Z. The access point Y and the access point Z are "N. Point Ext. RSSI Correlation Priority" access point Y (hereinafter "correlation access point" Y) and "N. Point Ext. RSSI Correlation Priority" access point Z (hereinafter "correlation access point" Z). The correlation access points Y and Z transmit a signal to one or more tablets 116A and 116*b*. Each of the tablets 116A and 116B measure an RSSI value from each of the access points Y and Z.

For example, when the tablet 116A receives a signal from access point Y, the tablet 116A can measure an RSSI of the signal from access point Y and when the tablet 116B receives a signal from access point Z, the tablet 116B can measure an RSSI of the signal from access point Z. The tablets 116A and 116B also store correlated inferences based on frequency of use, time of day, and other metrics associated with each electronic device of the list of electronic devices 805, 810, 815, 820, 825, 830, and 835. The inferences are collected by at least one of the tablets 116A and 116B from past usage of the electronic devices 805, 810, 815, 820, 825, 830, and 835. The tablets 116A and 116B can determine a probability of an electronic device being activated or used based on the inferences and the measured RSSI values from signals received from the access points Y and Z.

In an embodiment, it is possible for an electronic device to have no relationship with an RSSI value. This could be the case with a thermostat that would control a temperature throughout a house or building. In this case, only the inferences may be used to determine a probability of the device being activated. It should be understood that the relative probability of different devices are used to prioritize which electronic devices are to be displayed for activation and control on the tablet 116A or 116B as well as any other client device.

Although FIG. 8 illustrates one example monitoring and automation system 800 according to this disclosure, various changes may be made to FIG. 8. For example, end points could be grouped by one or more different or additional factors known by a person having ordinary skill in the pertinent arts.

Figure 9:
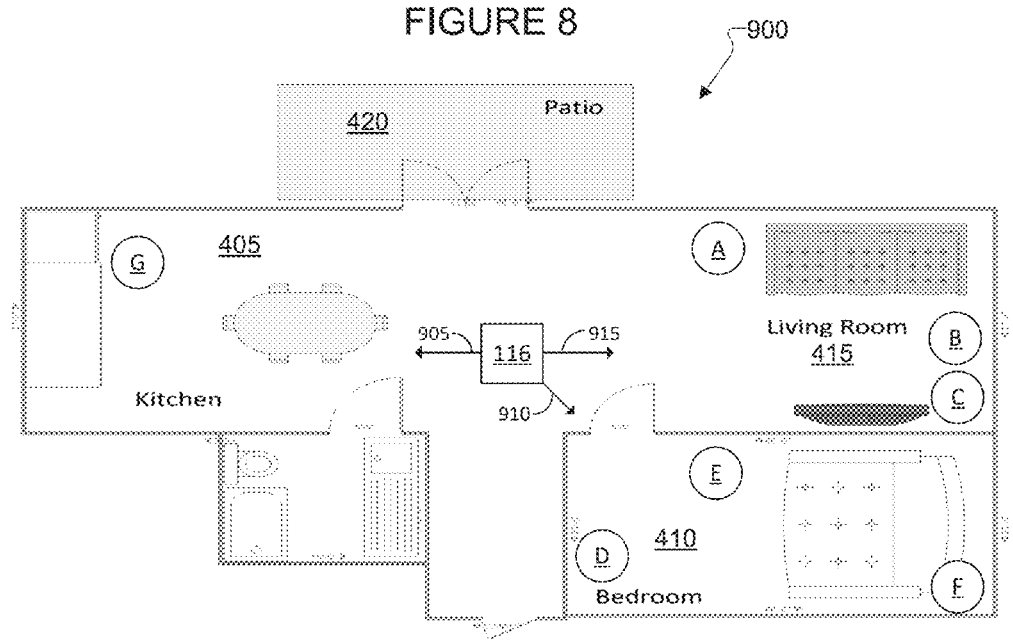

FIG. 9 illustrates an example monitoring and automation system 900 according to this disclosure. The embodiment of the monitoring and automation system 900 illustrated in FIG. 9 is for illustration only, and the monitoring and automation system 900 of FIG. 9 could have the same or similar configurations. However, monitoring and automation systems come in a wide variety of configurations, and FIG. 9 does not limit the scope of this disclosure to any particular implementation of a monitoring and automation system.

The monitoring and automation system 900 includes many of the same or similar features of the monitoring and automation system 400 including one or more end points A, B, C, D, E, F, and G each associated with electronic devices. The tablet 116 determines a direction it is facing or a direction that it is moving towards and prioritizes end points A, B, C, D, E, F, and G based on the direction. For example, when the tablet 116 faces or moves towards a first direction 905, the tablet 116 prioritizes or assigns the highest priority to end point G as discussed herein. When the tablet 116 faces or moves towards a second direction 910, the tablet 116 prioritizes or assigns the highest priority to end points D, E, and F as discussed herein. When the tablet 116 faces or moves towards a third direction 915, the tablet 116 prioritizes or assigns the highest priority to end points A, B, and C as discussed herein. The tablet 116 can display on the interface 500 command buttons of electronic devices associated with end points A, B, C, D, E, F, and G based on the assigned priority.

Although FIG. 9 illustrates one example monitoring and automation system 700 according to this disclosure, various changes may be made to FIG. 9. For example, end points could be grouped by one or more different or additional factors known by a person having ordinary skill in the pertinent arts.

Figure 10:
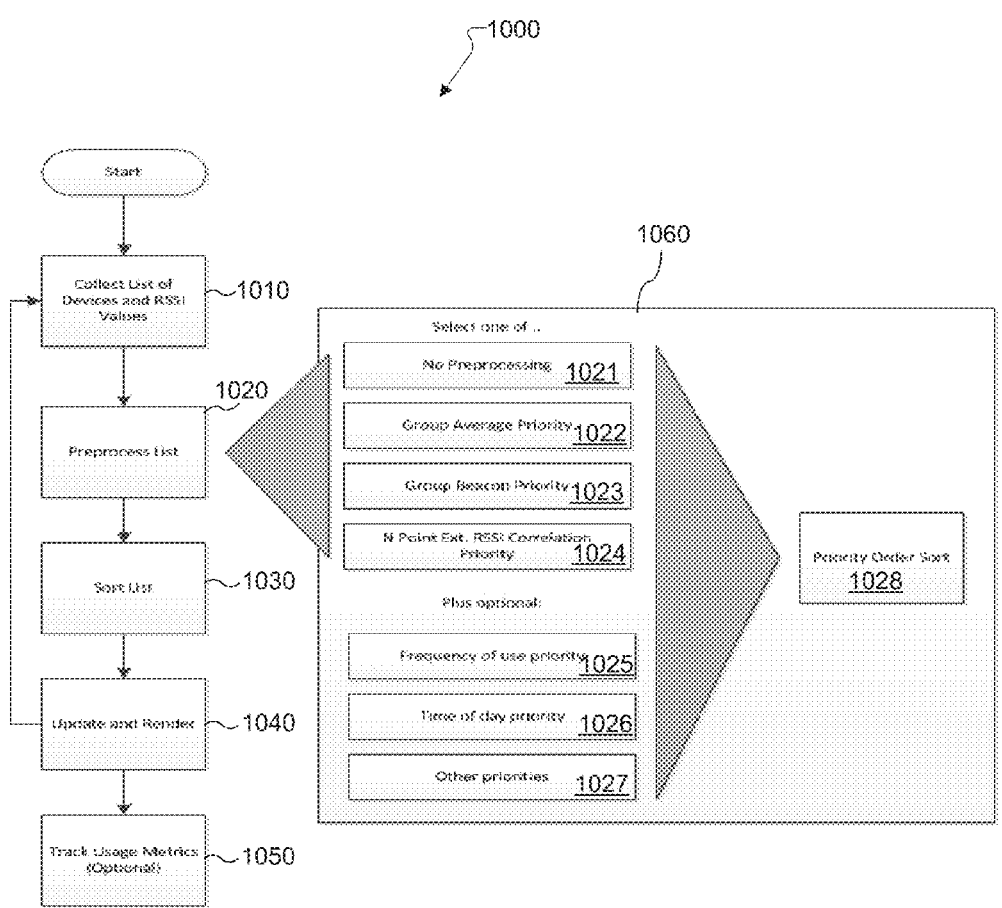
FIGS. 10 and 11 illustrate flow diagrams for example methods implemented using a mobile electronic device according to this disclosure.

FIG. 10 is a flow diagram illustrating an example method 1000 implemented using a mobile electronic device to arrange a display of automated electronic devices according to this disclosure. While the flow chart depicts a series of operations, unless explicitly stated, no inference should be drawn from that sequence regarding specific order of performance, performance of operations or portions thereof serially rather than concurrently or in an overlapping manner, or performance of the operations depicted exclusively without the occurrence of intervening or intermediate steps. The operations depicted in the example depicted are implemented by processing circuitry in, for example, a mobile electronic device, such as the mobile electronic device 116.

In operation 1010, a mobile electronic device collects a list of electronic devices and RSSI values. In an embodiment, collecting a list of electronic devices can include identifying a list of end points associated with the electronic devices and RSSI values of the end points. In operation 1020, the mobile electronic device preprocesses the list. When the mobile electronic device preprocesses the list, the mobile electronic device can provide a menu 1070 on a display (such as display 255 illustrated in FIG. 2) to receive a selection of at least one of "no processing" via button 1021, "group average processing" via button 1022, "group beacon priority" via button 1023, "N. Point Ext. RSSI Correlation Priority" via button 1024, "frequency of use priority" via button 1025, "time of day priority" via button 1026, and "other priorities" via button 1027. After receiving one or more the selections, the electronic device can receive a "priority order sort" input via button 1028. In operation 1030, the mobile electronic device sorts the list that corresponds to the received one or more selections in response to receiving the "priority order sort" input via the button 1028. In operation 1040, the mobile electronic device updates a list of the electronic devices based on the sort and renders the updated list on the display. In an embodiment, after the mobile electronic device updates the list of electronic devices based on the sort and renders the updated list on the display, the mobile electronic device can repeat the method beginning at operation 1010 and collect another list of electronic devices and RSSI values. For example the mobile electronic device can collect another list of electronic devices and RSSI values in response to detecting that the mobile electronic device has moved from a first location to a second location.

In operation 1050, after the mobile electronic device updates the list of electronic devices based on the sort and renders the updated list on the display, the mobile electronic device can track usage metrics of electronic devices on the list of electronic devices. For example, the mobile electronic device can track and store how often the mobile electronic device transmits a command to operate a particular electronic device or when the mobile electronic device transmits a command to operate a particular electronic device.

Although FIG. 10 illustrates a flow diagram illustrating one example method 1000 implemented using a mobile electronic device to arrange a display of automated electronic devices according to this disclosure, various changes may be made to FIG. 10. For example, various operations in FIG. 10 could be combined, further subdivided, or omitted and additional operations could be added according to particular needs.

Figure 11:
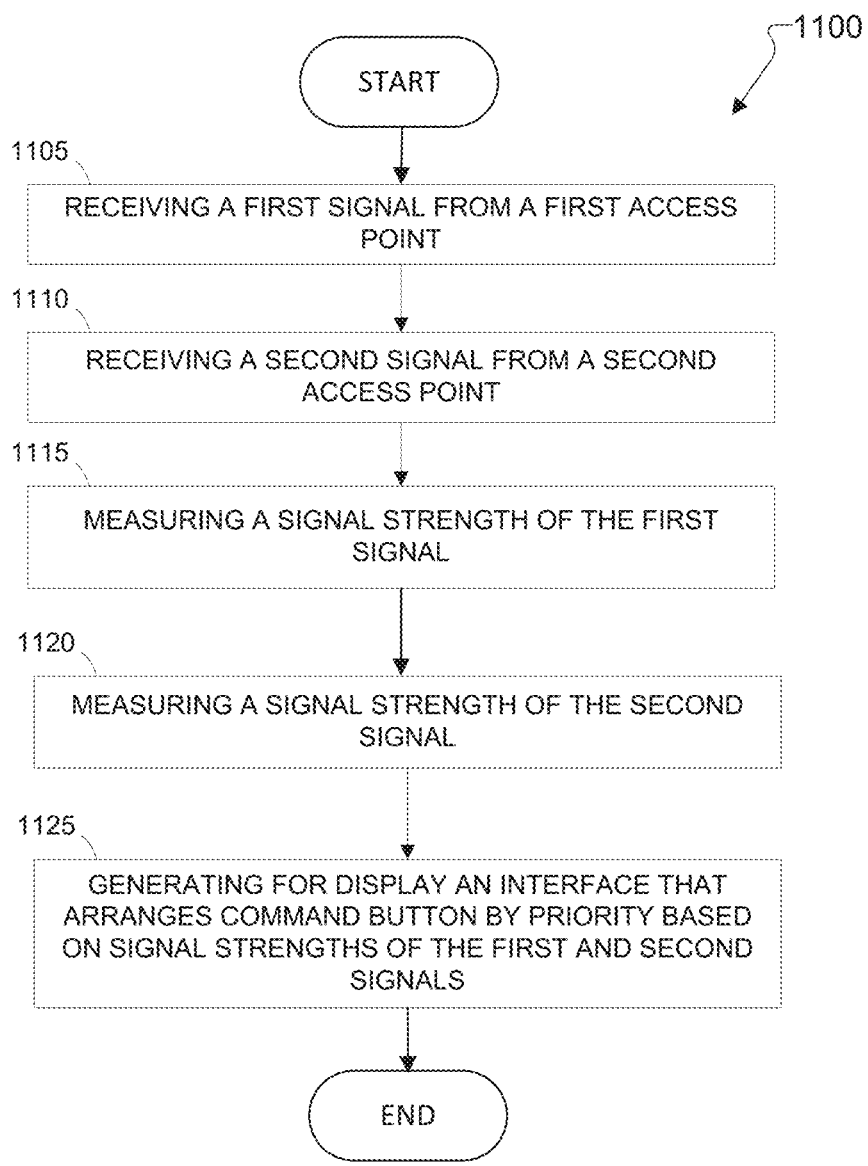

FIG. 11 is a flow diagram illustrating an example method 1100 implemented using a mobile electronic device to arrange a display of automated electronic devices according to this disclosure. While the flow chart depicts a series of operations, unless explicitly stated, no inference should be drawn from that sequence regarding specific order of performance, performance of operations or portions thereof serially rather than concurrently or in an overlapping manner, or performance of the operations depicted exclusively without the occurrence of intervening or intermediate steps. The operations depicted in the example depicted are implemented by processing circuitry in, for example, a mobile electronic device, such as the mobile electronic device 116.

In operation 1105, a mobile electronic device receives a first signal from a first end point. In operation 1110, the mobile electronic device receives a second signal from a second end point. The first signal from a first end point and a second signal from a second end point are received via SRC. In an embodiment, the first end point is associated with a first electronic device and the second end point is associated with a second electronic device. The first electronic device and the second electronic device each can comprise at least one of a light, a television, a door, a window, or the like.

In operation 1115, the mobile electronic device measures a signal strength of the first signal. In operation 1120, the mobile electronic device measures a signal strength of the second signal. In an embodiment, the mobile electronic device measures the signal strength of the first signal and the signal strength of the second signal in response to detecting a change in location of the mobile electronic device.

In operation 1125, the mobile electronic device generating for a display an interface that arranges a first command button associated with the first end point and a second command button associated with a second end point into different display priority slots as a function of the measured signal strength of the first signal and the measured signal strength of the second signal. The first command button is configured to receive an input to command an operation of the first electronic device. The second command button is configured to receive an input to command an operation of the second electronic device. The interface arranges the first command buttons in a higher priority display priority slot on the interface than the second command button when the measured signal strength of the first signal is greater than the measured signal strength of the second signal.

In an embodiment, the first end point is associated with a first group of electronic devices. The second end point is associated with a second group of electronic devices. The interface is generated for display to arrange a plurality of command buttons associated with the first group of electronic devices into higher priority display priority slots than a plurality of command buttons associated with the second group of electronic devices as a function of the measured signal strength of the first signal and the measured signal strength of the second signal.

In operation 1050, after the mobile electronic device updates the list of electronic devices based on the sort and renders the updated list on the display, the mobile electronic device can track usage metrics of electronic devices on the list of electronic devices. For example, the mobile electronic device can track and store how often the mobile electronic device transmits a command to operate a particular electronic device or when the mobile electronic device transmits a command to operate a particular electronic device.

Although FIG. 11 illustrates a flow diagram illustrating one example method 1000 implemented using a mobile electronic device to arrange a display of automated electronic devices according to this disclosure, various changes may be made to FIG. 11. For example, various components in FIG. 11 could be combined, further subdivided, or omitted and additional components could be added according to particular needs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile electronic device comprising:
 a transceiver configured to receive at least a first signal from a first end point and a second signal from a second end point; and
 a controller comprising processing circuitry configured to:
  measure a signal strength of the first signal and a signal strength of the second signal, and
  generate for a display an interface that arranges a first command button associated with the first end point and a second command button associated with a second end point into different display priority slots as a function of the measured signal strength of the first signal and the measured signal strength of the second signal.

2. The mobile electronic device of claim 1, wherein the interface arranges the first command buttons in a higher priority display priority slot on the interface than the second command button when the measured signal strength of the first signal is greater than the measured signal strength of the second signal.

3. The mobile electronic device of claim 1, wherein the first end point is associated with a first electronic device and the second end point is associated with a second electronic device, and wherein the first command button is configured to receive an input to command an operation of the first electronic device and the second command button is configured to receive an input to command an operation of the second electronic device.

4. The mobile electronic device of claim 3, wherein the first electronic device and the second electronic device each comprise at least one of a light, a television, a door, or a window.

5. The mobile electronic device of claim 1, wherein the first end point is associated with a first group of electronic devices and the second end point is associated with a second group of electronic devices, and wherein the controller is configured to generate for display the interface to arrange a plurality of command buttons associated with the first group of electronic devices into higher priority display priority slots than a plurality of command buttons associated with the second group of electronic devices as a function of the measured signal strength of the first signal and the measured signal strength of the second signal.

6. The mobile electronic device of claim 1, wherein the controller is configured to measure the signal strength of the first signal and the signal strength of the second signal in response to detecting a change in location of the mobile electronic device.

7. The mobile electronic device of claim 1, wherein the transceiver is configured to receive the first signal from a first end point and a second signal from a second end point via short range communication (SRC).

8. A mobile electronic device comprising:
a transceiver is configured to receive a first plurality of signals from a first plurality of end points and a second plurality of signals from a second plurality of end points; and
a controller comprising processing circuitry configured to:
measure a signal strength of each of the first plurality of signals and a signal strength of each of the second plurality of signals,
average the signal strengths of the first plurality of signals and the signal strengths of the second plurality of signals, and
generate for a display an interface that arranges a first set of command buttons associated with the first plurality of end points and a second set of command buttons associated with the second plurality of end points into different display priority slots as a function of an average signal strength of the first plurality of signals and the average signal strength of the second plurality of signals.

9. The mobile electronic device of claim 8, wherein the interface arranges the first set of command buttons in higher priority display priority slots on the interface than the second set of command buttons when the average signal strength of the first plurality of signals is greater than the average signal strength of the second plurality of signals.

10. The mobile electronic device of claim 8, wherein each of the first plurality of end points and each of the second plurality of end points are associated with an electronic device, wherein each command button of the first set of command buttons are configured to receive an input to command an operation of an electronic device associated with the first plurality of end points, and wherein each command button of the second set of command buttons are configured to receive an input to command an operation of an electronic device associated with the second plurality of end points.

11. The mobile electronic device of claim 10, wherein each of the electronic devices comprise at least one of a light, a television, a door, or a window.

12. The mobile electronic device of claim 8, wherein the controller is configured to measure a signal strength of each of the first plurality of signals and a signal strength of each of the second plurality of signals in response to detecting a change in location of the mobile electronic device.

13. The mobile electronic device of claim 8, wherein the transceiver is configured to receive the first plurality of signals from the first plurality of end points and the second plurality of signals from the second plurality of end points via short range communication (SRC).

14. A method implemented using a mobile electronic device, the method comprising:
receiving at least a first signal from a first end point and a second signal from a second end point;
measuring a signal strength of the first signal and a signal strength of the second signal; and
generating for a display an interface that arranges a first command button associated with the first end point and a second command button associated with a second end point into different display priority slots as a function of the measured signal strength of the first signal and the measured signal strength of the second signal.

15. The method of claim 14, wherein the interface arranges the first command buttons in a higher priority display priority slot on the interface than the second command button when the measured signal strength of the first signal is greater than the measured signal strength of the second signal.

16. The method of claim 14, wherein the first end point is associated with a first electronic device and the second end point is associated with a second electronic device, and wherein the first command button is configured to receive an input to command an operation of the first electronic device and the second command button is configured to receive an input to command an operation of the second electronic device.

17. The method of claim 16, wherein the first electronic device and the second electronic device each comprise at least one of a light, a television, a door, or a window.

18. The method of claim 14, wherein the first end point is associated with a first group of electronic devices and the second end point is associated with a second group of electronic devices, and wherein the interface is generated for display to arrange a plurality of command buttons associated with the first group of electronic devices into higher priority display priority slots than a plurality of command buttons associated with the second group of electronic devices as a function of the measured signal strength of the first signal and the measured signal strength of the second signal.

19. The method of claim 14, wherein the signal strength of the first signal and the signal strength of the second signal is measured in response to detecting a change in location of the mobile electronic device.

20. The method of claim 14, wherein the first signal from a first end point and a second signal from a second end point are received via short range communication (SRC).

* * * * *